US008838435B2

(12) United States Patent
Talley et al.

(10) Patent No.: US 8,838,435 B2
(45) Date of Patent: Sep. 16, 2014

(54) COMMUNICATION PROCESSING

(75) Inventors: James R. Talley, Austin, TX (US); Mir F. Ali, Rolling Meadows, IL (US); Guohua Hao, Vernon Hills, IL (US); Haifeng Li, Scarsdale, NY (US); Jianguo Li, Chicago, IL (US); Dale W. Russell, Palatine, IL (US)

(73) Assignee: Motorola Mobility LLC, Libertyville, IL (US)

( * ) Notice: Subject to any disclaimer, the term of this patent is extended or adjusted under 35 U.S.C. 154(b) by 423 days.

(21) Appl. No.: 13/348,368

(22) Filed: Jan. 11, 2012

(65) Prior Publication Data

US 2013/0179149 A1 Jul. 11, 2013

(51) Int. Cl.
*G10L 15/00* (2013.01)
(52) U.S. Cl.
USPC .................................. 704/2; 704/9; 707/771
(58) Field of Classification Search
USPC .......................................... 704/2, 9; 707/771
See application file for complete search history.

(56) References Cited

U.S. PATENT DOCUMENTS

| 7,865,354 | B2 | 1/2011 | Chitrapura et al. |
| 7,877,345 | B2 | 1/2011 | Nigam et al. |
| 7,962,529 | B1 | 6/2011 | Datar et al. |
| 8,200,477 | B2 * | 6/2012 | Yi et al. ............................ 704/9 |
| 8,356,025 | B2 * | 1/2013 | Cai et al. ....................... 707/708 |
| 2005/0091038 | A1 | 4/2005 | Yi et al. |
| 2006/0200341 | A1 | 9/2006 | Corston-Oliver et al. |
| 2008/0133488 | A1 | 6/2008 | Bandaru et al. |
| 2010/0050118 | A1 | 2/2010 | Chowdhury et al. |
| 2011/0137906 | A1 | 6/2011 | Cai et al. |
| 2013/0304469 | A1 * | 11/2013 | Kamada et al. ............... 704/239 |

OTHER PUBLICATIONS

Liu, Bing: "Opinion Mining and Sentiment Analysis: NLP Meets Social Sciences", Department of Computer Science University of Illinois at Chicago, http://www.cs.uic.edu/~liub/FBS/sentiment0analysis.html, Hawaii, May 22-23, 2010, all pages.
Han, Jiawei et al.: "Mining Frequent Patterns without Candidate Generation: A Frequent-Pattern Tree Approach", Data Mining and Knowledge Discovery, 8 53-87, 2004, 2004 Kluwer Academic Publishers, Received May 21, 2000, Revised Apr. 21, 2001, all pages.
Bermingham, Adam et al.: "Combining Social Network Analysis and Sentiment Analysis to Explore the Potential for Online Radicalisation", in ASONAM 2009—Advances in Social Networks Analysis and Mining, Jul. 20-22, 2009, Greece, all pages.

(Continued)

*Primary Examiner* — Daniel D Abebe
(74) *Attorney, Agent, or Firm* — Dority & Manning, P.A.

(57) ABSTRACT

Disclosed are methods and apparatus for processing linguistic expressions (e.g., opinionated text documents). The linguistic expressions are processed by, firstly, detecting topics of interest discussed in the linguistic expressions. The sentiment, or sentiments, of an originator with respect to each of the topics detected in the linguistic expressions is then assessed. The originators are then grouped (or clustered) into one or more groups based on the similarities between the originators' respective sets of detected topics and corresponding sentiments. Semantic information is then associated with a given group. Finally, for a given member of a given group, a profile is created or updated. This profile comprises attributes that may be based on a degree of membership of the given member to the given group and the semantic information associated with the given group.

14 Claims, 4 Drawing Sheets

(56) References Cited

OTHER PUBLICATIONS

Basile, Pierpaolo et al.: "Recommending Smart Tags in a Social Bookmarking System", Bridging the Gap between Semantic Web and Web 2.0, http://www.kde.cs.uni-kassel.de/ws/eswc2007/proc/RecommendingSmartTags.pdf, p. 22-29, 2007.

Adaptive Semantics Inc.: http://adaptive semantics.com/home/julia, For Community Developers and Managers, 2009, all pages.

Nguyen, Thin et al.: Hyper-community detection in the blogsphere Proceeding WSM'10, Proceedings of second ACM SIGMM workshop on Social media, ACM, New York, NY USA, 2010, all pages.

Liu, Jinze: "Semi-Supervised Clustering", CS685: Special Topics in Data Mining, Spring 2008, The University of Kentucky, all pages.

Leung et al.: "Integrating Collaborative Filtering and Sentiment Analysis: A Rating Inference Approach", Proceedings of the ECAI 2006 Workshop on Recommender Systems, all pages.

Andrzejewski, David Michael: "Incorporating Domain Knowledge in Latent Topic Models", A dissertation submitted in partial fulfillment of the requirements for the degree of Doctor of Philosophy (Computer Sciences) at the University of Wisconsin-Madison, 2010, all pages.

Grira, Nizar et al.: "Unsupervised and Semi-supervised Clustering: a Brief Survey", in A review of Machine Learning Techniques for Processing Multimedia Content, Report of the MUSCLE European Network of Excellence (6th Framework Programme), Aug. 15, 2005, all pages.

Dai, Honghua et al.: "Integrating Semantic Knowledge with Web Usage Mining for Personalization", Information Systems Journal (2005), Publisher: IRM Press, Idea Group Publishing, pp. 1-28.

Mei, Qiaozhu et al.: "Topic Sentiment Mixture: Modeling Facets and Opinions in Weblogs", WWW 2007, May 8-12, 2007, Banff, Alberta, Canada, all pages.

Dasgupta, Sajib et al.: "Topic-wise, Sentiment-wise, or Otherwise? Identifying the Hidden Dimension for Unsupervised Text Classification", Proceedings of the 2009 Conference on Empirical Methods in Natural Language Processing (EMNLP), pp. 580-589, Suntec, Singapore, Aug. 2009, all pages.

Ganu, Gayatree et al.: Improving the Quality of Predictions using Textual Information in Online User Reviews, http://spidr-ursa.rutgers.edu/resources/IS.pdf, Mar. 5, 2012, all pages, Department of Computer Science, Rutgers University, USA.

Nguyen, Thin et al.: Hyper-community detection in the blogsphere, Proceeding WSM'10, Proceedings of second ACM SIGMM workshop on Social media, http://www.computing.edu.au/~phung/wiki_new/uploads/Main/Nguyen_etal_acm10.pdf, 2010, all pages, ACM, New York, NY USA.

Juana Maria Ruiz-Martinez et al.: Semantic-Based Sentiment analysis in financial news, http://nadir.uc3m.es/feosw2012/proceedings/FEOSWp4.pdf, Jun. 21, 2012, all pages, School of Computing University of Murcia, Espinardo (Murcia), Spain.

\* cited by examiner

US 8,838,435 B2

COMMUNICATION PROCESSING

FIELD OF THE INVENTION

The present invention relates to the processing of a plurality of linguistic expressions, in particular, linguistic expressions in which originators of those linguistic expressions express sentiments with respect to one or more topics.

BACKGROUND OF THE INVENTION

In the fields of advertising and retail, knowledge about a consumer, e.g., the consumer's affinities, likes, dislikes, opinions, hobbies, interests, etc., tends to be useful. For example, knowing a consumer's likes may be used to better recommend a product to that consumer.

Such knowledge about a consumer may be acquired directly from that consumer. However, it is often the case that consumers have reservations about providing such information and defer or avoid doing so.

Separate from the above mentioned fields, methods of extracting topics discussed in a text document, and assessing the author's sentiment with respect to the text document's topics, are known.

BRIEF SUMMARY

According to aspects of the present invention a method of and apparatus for processing linguistic expressions are provided. Linguistic expressions may include, for example, statements, musings, stories, jokes, etc. which may be provided in any format including, but not limited to, as a text document or verbally (e.g., as an audio recording). Each linguistic expression originates from an originator (e.g., a consumer) and is a linguistic expression in which the originator of that linguistic expression expresses a sentiment with respect to one or more topics. The processing of the communications may be performed as follows. Firstly, in each linguistic expression, topics of interest discussed by the linguistic expression's originator are detected. Sentiments of the originator with respect to each of the topics discussed are then assessed. The originators are then grouped (or clustered) into one or more groups. This grouping may be performed based on the similarities between the originators' respective sets of detected topics and their corresponding sentiments. Semantic information relating to one or more of the members of a given group may then be associated with that given group (i.e., with all the members of that given group). Finally, for a member of the given group a profile is created, or an existing profile is updated. This profile may be created or updated so as to comprise attributes of that member or originator. The attributes may be dependent upon the membership in the given group of that member or originator (e.g., the degree of affiliation which that member or originator has with the given group), and the semantic information that has been associated with the given group. The profile of an originator may additionally comprise membership values for any or each of the groups of which that originator is a member. These membership values may be dependent on the strengths of that originator's affiliations with the respective groups.

Each originator may be a user of a network (e.g., the Internet, an intranet, or a social network). Also, each communication may be made available (e.g., by its originator) on the network to other users of the network.

The semantic information associated with a given group may be based on categorization information (e.g., a "self-categorization") relating to a member of the given group. The semantic information associated with the given group may be based on knowledge of a given topic and knowledge of a predominant sentiment of the members of the given group with respect to that given topic. Also, semantic information for a given group may be inferred by relating the dominant, shared topic-sentiment pairs of the group with external sources of information. Thus, a profile for an originator may be built, even when categorization data are difficult, or impossible, to directly acquire from that originator.

Content (e.g., advertisements or product recommendations or media of interest) may be delivered to an originator, depending on the profile of that originator. A profile of an originator may contain relatively rich information about that originator's affinities, likes, dislikes, interests, etc. Thus, relatively accurate targeted advertising, product recommendation, etc. tend to be provided for.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
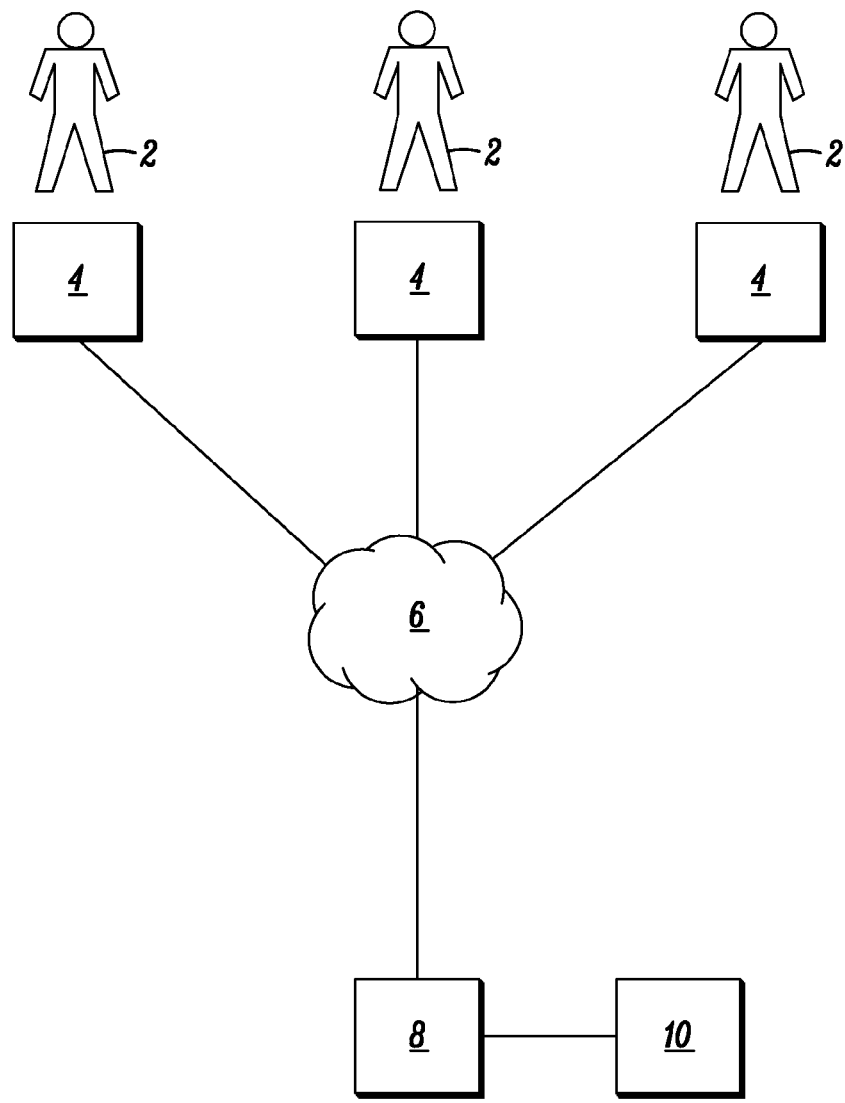
FIG. 1 is a schematic illustration (not to scale) of an example of a network.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

Referring now to the Figures, FIG. 1 is a schematic illustration (not to scale) of an example network in which an embodiment of a method of characterising users is implemented. The terminology "user" is used herein to refer to a user of a computation or a communication device, which are hereinafter referred to as "user devices."

The network comprises a plurality of users 2, a plurality of user devices 4, the Internet 6, a processor 8, and a database 10.

Each of the users 2 is a human user of a respective user device 4. The users 2 are to be categorized as described below with reference to FIG. 2.

The user devices 4 may be electronic devices, such as computers (e.g., desktop or tablet computers), smart phones, etc. Each user device 4 may be used by a respective user 2 to produce one or more text documents. The terminology "text document" may include, but is not limited to, web-logs (i.e., "blogs"), emails, status updates (e.g., on social networking sites such as Facebook™ or Twitter™), responses to news items (e.g., posted on news websites or forums), product reviews (e.g., posted on retailer websites or forums), etc. These text documents may be produced in any way, e.g., typed (i.e., on a keyboard or keypad) or produced using voice recognition software. The text documents may be of any length, i.e., of one or more words. The text documents may be in any language (e.g., English, French, etc.). The text documents may use abbreviations or slang, e.g., as commonly used in mobile phone text messaging. The text documents may relate to any subject or topic, and a given text document may relate to one or more topics. The text documents may express the sentiments of the user 2 towards one or more of the topics discussed within the text document.

Each user 2 may produce one or more text documents in a given time period. The users 2 may each produce a different number of text documents in a given time period.

Each of the user devices 4 is coupled, via a communications pathway (e.g., the Internet 6), to the processor 8. This is such that the processor 8 may access the text documents produced by each user 2 using the respective user device 4. For example, one or more of the text documents may be retrieved by the processor 8 from one or more of the user devices 4, or, one or more of the text documents may be sent to the processor 8 from one or more of the user devices 4.

The text documents produced by the users 2 may be accessible (or made accessible) to the processor 8 in any way. For example, a user 2 may explicitly grant permission to the processor 8 to access the text documents he produces (e.g., by that user 2 subscribing to a particular service or in exchange for some kind of reward). Also for example, a text document of a user 2 may be within the public domain, thereby making the text document accessible to the processor 8.

The processor 8 may be able to distinguish text documents produced by one of the users 2 from text documents produced by a different user 2. In other words, the processor 8 may be able to ascertain the author of each of the text documents (i.e., a text document's provenance). The provenance of a text document may be explicitly indicated or the processor 8 may determine the provenance in any appropriate way, e.g., by using the network source (e.g., an Internet Protocol address) of the text document.

The processor 8 processes the accessed text documents to categorize the users 2. An embodiment of a user-categorization process is described in more detail below with reference to FIG. 2.

The processor 8 is coupled to the database 10 such that data may be passed between the processor 8 and the database 10. In particular, data from the processor 8 may be sent to the database 10 for storage. Also, data stored in the database 10 may be retrieved by the processor 8.

Apparatus, including the processor 8, for implementing the above arrangement, and for performing the method steps to be described below, may be provided by configuring or adapting any suitable apparatus, for example one or more computers or other processing apparatus or processors, or providing additional modules. The apparatus may comprise a computer, a network of computers, or one or more processors, for implementing instructions and using data, including instructions and data in the form of a computer program or plurality of computer programs stored in or on a machine-readable storage medium such as computer memory, a computer disk, ROM, PROM, etc., or any combination of these or other storage media.

It should be noted that certain of the process steps depicted in the flowcharts of FIGS. 2 and 4 and described below may be omitted or such process steps may be performed in differing order to that shown in FIGS. 2 and 4. Furthermore, although all the process steps have, for convenience and ease of understanding, been depicted as discrete temporally-sequential steps, nevertheless some of the process steps may in fact be performed simultaneously or at least overlapping to some extent temporally.

Figure 2:
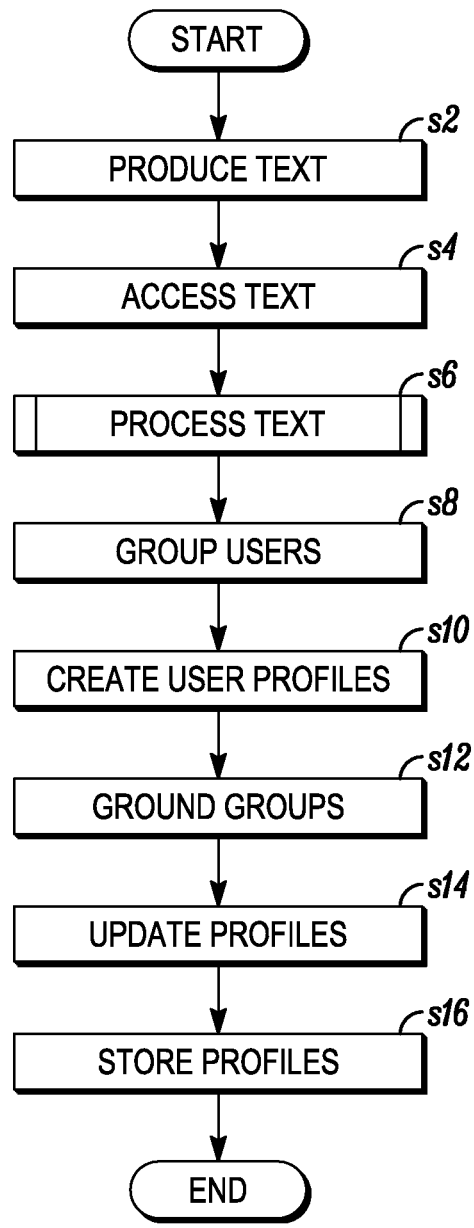
FIG. 2 is a flow chart showing certain steps of an example process performed by entities of a network.

FIG. 2 is a flow chart showing certain steps of an example process performed by the entities of the network. In this example process, an embodiment of a method of characterising the users 2 is implemented.

At step s2, each of the users 2 produces one or more text documents using his respective user device 4.

A step s4, the processor 8 accesses the text documents produced by the users 2 at step s2. The processor 8 accesses the text documents via the Internet 6. Also, the processor 8 may access a text document by retrieving that text document (e.g., from a server) or being sent that text document (e.g., from a user device 4 via the Internet 6).

At step s6, the processor 8 processes the accessed text documents. A method by which the processor 8 may process the text documents is described in more detail below with reference to FIG. 4.

The text documents are processed by the processor 8 to produce user-topic-sentiment (UTS) tuple data points. A UTS data point may be expressed in the following format:

$$(u,t,s,x)$$

where u is an identifier for a user 2 (e.g., an identification number assigned by the processor 8 to a particular user 2), t is an identifier for a topic discussed by the user u in a particular text document produced by the user u (e.g., an identification number assigned by the processor 8 to a particular topic discussed by that user 2), s is a value indicative of the sentiment of the user u expressed in the particular text document with respect to the topic to which the identifier t is assigned, and x is additional information, e.g., a value or values representative of one or more pieces of additional information (e.g., a time stamp, a source of the particular text document, an identifier for the particular text document, or an identifier for a sub- or super-category for the topic t).

A value for the parameter u may be specified by, for example, assigning to each user 2 a respective number $1, \ldots, U$, where U is the number of users 2.

A value for the parameter t may be specified by, for example, assigning to each topic identified in the process performed at step s6 (and described in more detail below with reference to FIG. 4) a respective number $1, \ldots, T$, where T is the number of identified topics.

A value for the parameter s may be a value in a continuous range of values, e.g., $-1 \leq s \leq 1$. A value for s may be indicative of the user's sentiment with respect to the topic t. For example, s=−1 may indicate that the user u has a strongly negative opinion with respect to the topic t; s=0 may indicate that user u is ambivalent (i.e., is neutral) with respect to the topic t; and s=1 may indicate that the user u has a strongly positive opinion with respect to the topic t. The determination of a value for the parameter s may be performed as described in more detail later below with reference to FIG. 4.

Figure 3:
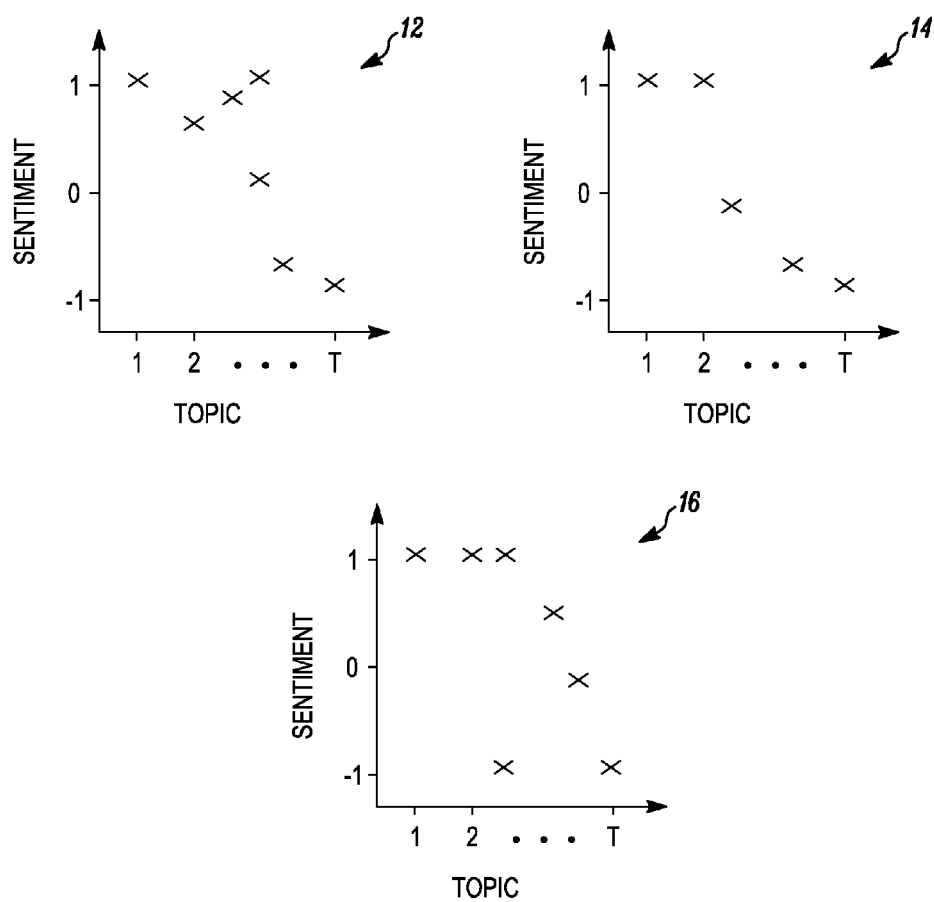
FIG. 3 presents graphical representations of three users' sets of topic-sentiment data points.

FIG. 3 is a schematic illustration (not to scale) showing graphical representations of three sets of UTS data points for example users 2.

In particular, FIG. 3 shows a first set of UTS data points (hereinafter referred to as the "first set" and indicated in FIG. 3 by the reference numeral 12), a second set of UTS data points (hereinafter referred to as the "second set" and indicated in FIG. 3 by the reference numeral 14), and a third set of UTS data points (hereinafter referred to as the "third set" and indicated in FIG. 3 by the reference numeral 16).

The first set 12 is a set of UTS data points for a first user (i.e., u=1). The second set 14 is a set of UTS data points for a second user (i.e., u=2). The third set 16 is a set of UTS data points for a third user (i.e., u=3). Each of the data sets 12, 14, 16 is a relatively sparse data set.

At step s8, using the determined UTS data points, the users 2 are grouped (or clustered) into one or more different groups. In particular, the users 2 are grouped together based on the similarity of their respective sets of UTS data points (i.e., users 2 having similar sets of UTS data points are grouped together). A user 2 may be a member of one or more groups. This may be performed such that, for each group that a particular user 2 is grouped into, that user 2 is assigned a "membership value" indicative of that user's affinity with that group (i.e., a value indicative of the "strength of membership" of that user 2 to that group). The membership values of the users 2 with respect to the groups may be expressed in matrix form, e.g., as follows:

$$\begin{pmatrix} m_{1,1} & m_{1,2} & \ldots & m_{1,K} \\ m_{2,1} & m_{2,2} & \ldots & m_{2,K} \\ \ldots & \ldots & \ldots & \ldots \\ m_{U,1} & m_{U,2} & \ldots & m_{U,K} \end{pmatrix} = \begin{pmatrix} 0.93 & 0.00 & \ldots & 0.34 \\ 0.76 & 0.80 & \ldots & 0.00 \\ \ldots & \ldots & \ldots & \ldots \\ 0.00 & 0.96 & \ldots & 0.21 \end{pmatrix}$$

where $m_{i,j}$ is a membership value for the ith user (i.e., u=i) with respect to the jth group (i.e., k=j, where k is an identifier for a group into which the users 2 are grouped, and k=1, ..., K, where K is the number of groups).

Advantageously, from the matrix of membership values it is possible to ascertain the membership value of a given user 2 with respect to a given group.

Any appropriate clustering or grouping method may be used to group the users 2 into the one or more groups. For example, a process comprising the clustering method (in which users are each represented as a set of elements) described in U.S. Pat. No. 7,962,529, which is incorporated herein by reference, may be used. Such a clustering or grouping method may be performed periodically to incrementally update the groups of users as more data (e.g., more text documents) become available.

At step s10, for each of the users 2, the processor 8 creates a "user profile." In this embodiment, a user profile for a particular user 2 comprises the membership value for that user 2 for each of the groups. A user profile may be such that it is possible to ascertain the membership value of the relevant user 2 with respect to a given group. For example, the user profiles may be expressed in vector form, e.g., as follows:

$$P_1 = \begin{pmatrix} m_{1,1} \\ m_{1,2} \\ \vdots \\ m_{1,K} \end{pmatrix} = \begin{pmatrix} 0.93 \\ 0.00 \\ \vdots \\ 0.34 \end{pmatrix}$$

$$P_2 = \begin{pmatrix} m_{2,1} \\ m_{2,2} \\ \vdots \\ m_{2,K} \end{pmatrix} = \begin{pmatrix} 0.76 \\ 0.80 \\ \vdots \\ 0.00 \end{pmatrix}$$

etc., where $P_i$ is the user profile for the ith user (i.e., u=i).

However, in other embodiments, a user profile for a particular user 2 may comprise different information or be expressed in a different way. For example, a user profile may comprise membership values for only certain of the groups. For example, for a given user 2, a user profile may contain only membership information for those groups that correspond to a membership value over a pre-determined threshold value. Also for example, for a given user 2, a user profile may only contain membership information for the five groups corresponding to the five highest membership values.

At step s12, the processor 8 may determine semantic information for one or more of the groups. Semantic information for a given group may comprise any appropriate information relating to salient features of that group. For example, the semantic information relating to a given group may comprise a human-understandable (or computer-understandable) description of the group, a human-understandable (or computer-understandable) description of the members of that group, a human-understandable (or computer-understandable) description of the opinions (or beliefs, or values) of the members of that group, a human-understandable (or computer-understandable) description of the interests, hobbies, demographic characteristics, etc. of the members of that group, etc. In other embodiments, semantic information is only determined for some of the groups. For convenience, a process of determining semantic information for the groups is hereinafter referred to as "grounding" the groups.

The grounding of the groups may be performed using any appropriate method. For example, a method of grounding the groups may comprise using structured knowledge of the data domain (e.g., in the form of an ontology) to infer relationships among the groups and significant elements of that structured knowledge. The association of the groups of users to structured knowledge elements may be performed in any appropriate way.

An advantageously simple method of performing such an association comprises some or all of the users 2 categorizing themselves (as one or more categories). For example, a subset of the users 2 may provide categorizing information (e.g., by selecting appropriate items from a list on a webpage) for their hobbies, interests, political affiliations, sex, age, etc. This self-categorization by a subset of the users 2 may then be used to ground the groups (for example, if some or all of the users 2 who are "strong members" of a particular group each self-categorize as having certain interests, then that particular group may be described as containing members that have those interests). Advantageously, it tends to be possible to ground the groups without requiring that all users 2 directly specify their affinities.

Another example method of performing such an association comprises using knowledge of a topic and knowledge of a group's predominant sentiment with respect to that topic. For example, if it is known that a certain topic is viewed favorably by a certain type of person (e.g., a person of a certain age, sex, or political opinion, etc.), then a group that has a positive sentiment with regard to that topic (and similar topics) may be described as likely containing that certain type of person.

Thus, domain knowledge may be advantageously exploited to select or define characteristic attributes of the members of a given group. The definitions selected or defined for the groups may be of relevance to applications or entities that operate within the domain.

At step s14, the user profiles created at step s10 are updated to include some or all of the semantic information determined for the groups. A user profile for a particular user 2 may therefore comprise a membership value for a group (indicative of how affiliated with that group the particular user 2 is) and semantic information for that group that describes qualities of members of that group. For example, $P_1$ (an updated user profile for the 1st user) may comprise the following information: a membership value $m_{1,1}$=0.93 (i.e., the first user is a member of the first group with a membership value of 0.93) and semantic information specifying that the first group of people are horror movie fans. Thus, from this updated user profile for the first profile it may be inferred that the first user is a fan of horror movies.

Thus, at step s14 the user profiles are, in effect, grounded.

At step s16, the updated (i.e., grounded) user profiles are sent from the processor 8 to the database 10 for storage.

Thus, a method in which the users 2 are characterized is provided.

Figure 4:
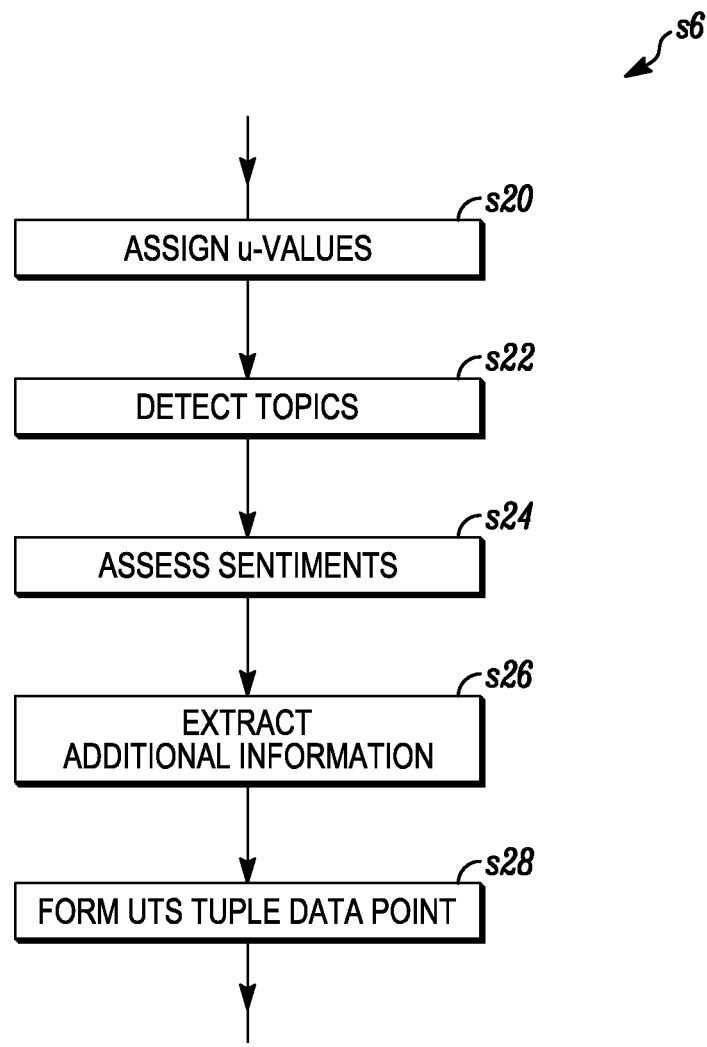
FIG. 4 is a flow chart showing certain substeps of step s6 of the process shown in FIG. 2.

FIG. 4 is a flow chart showing certain steps of the process performed at step s6 of the process shown in FIG. 2, i.e., the process of producing UTS data points.

At step s20, the processor 8 assigns to each of the users 2 an identifier u.

At step s22, for each user 2, the processor 8 processes each text document produced by that user 2 to detect topics discussed by that user 2 in that text document. Each detected topic is assigned an identifier t that may be used as an identifier for that topic.

At step s24, for each detected topic in each text document, the processor 8 assesses the sentiment with regard to that topic of the user 2 who produced that text document. The assessed sentiment may be indicated by a relative value s (e.g., a numerical value, a text label such as "strongly positive" or "ambivalent," etc.), i.e., a value that indicates the user's sentiment for a particular topic relative to that user's sentiment with respect to other topics, or other users' sentiments with respect to that and other topics.

Any appropriate topic analysis process may be performed by the processor 8 to detect the topics. Furthermore, any appropriate sentiment analysis (or opinion mining) process may be performed by the processor 8 to assess user sentiment. For example, topic analysis and sentiment analysis processes, such as those described in U.S. Pat. No. 7,877,345, U.S. Pat. No. 7,865,354, Bing Liu's 2010 presentation (2010) "Opinion Mining and Sentiment Analysis NLP Meets Social Sciences," STSC, Hawaii, May 22-23, 2010, U.S. Patent Publication 2010/0050118, and U.S. Patent Publication 2005/0091038 (each of which is each incorporated herein by reference) may be used.

At step s26, for each detected topic in each text document, the processor 8 extracts additional information x as desired. The additional information may comprise a time stamp, a source of the particular text document, an identifier for the particular text document, an identifier for a sub- or super-category for the topic, etc.

At step s28, the processor 8 forms UTS tuple data points (which may be expressed as (u, t, s, x)) from the u-values (assigned at step s20), the t-values (assigned at step s22), the s-values (determined at step s24), and the x-value (determined at step s26). The UTS tuple data points are formed such that in a tuple (u, t, s, x), the u-value is an identifier of a particular user 2, the t-value is an identifier of a particular topic discussed by that particular user 2, the s-value is indicative of the particular user's sentiment with respect to that particular topic, and the x-value represents additional information relating to that particular tuple. The UTS data points are collected into sets based upon their respective u values, i.e., a set of UTS data points is made for each user u.

Thus, a method of, for each user 2, producing a set of UTS tuple data points is provided.

The above described method and apparatus advantageously tend to provide that a useful profile of a user 2 (i.e., a producer of accessible text documents) may be generated. This profile may contain information relating to the user's opinions, views, or sentiment with respect to one or more topics. This information may advantageously be updated, e.g., by analyzing new text documents produced by that user 2, or by other users, and updating the groups, the users' associations to the groups, or the user's profile.

An advantage provided by the above described system and method is that, by analyzing a user's opinionated output, knowledge about a user 2 may be extracted and expressed in a convenient, usable form. The extracted knowledge about a user 2 tends to be richer than that which can be extracted using conventional means.

Knowledge about a user's affinities, likes, dislikes, interests, etc. tends to be useful in applications including targeted advertising, product recommendation, etc. For example, knowing a user's favorite movie genre may be useful to better recommend video (or other) content to that user 2. Also, knowing a user's political affiliation may be useful in a political fund raising campaign. The updated user profiles produced by performing the above described method tend to contain richer information about a user's affinities, likes, dislikes, interests, etc. than would otherwise be available. Thus, the updated profiles may be used to perform more accurate targeted advertising, product recommendation, etc. For example, products can be advertised or recommended to users 2 depending on their membership in certain groups (e.g., a user 2 whose user profile specifies that he is a "strong member" of a group that "likes horror movies" may be targeted with advertisements for the latest horror movie releases).

The characterization of the user 2 via a method such as that described above may also be beneficial to the user 2. For example, a user 2 may receive more appropriate product and media recommendations, etc. that better reflect the user's interests or opinions.

The above described method and apparatus advantageously allow for the generation of a profile of a user 2 that contains useful knowledge of the user's opinions on a plurality of topics, even when that information is difficult or impossible to directly acquire from that user 2 (e.g., if a direct collection mechanism for that knowledge doesn't exist). In other words, a user profile containing knowledge about a user 2 may be built up in an indirect and unobtrusive way. The above described method and apparatus tend to allow for the inferring of users' affinities without having all those users 2 directly specify their affinities.

The synergistic combination of topic detection, sentiment analysis, clustering, and cluster grounding allows for information about a user's interests, opinions, etc. to be inferred, even when no such information is provided by or available from the user 2. Furthermore, a user profile may advantageously be generated for a given user 2 even if topic-sentiment data are sparse for that given user 2.

In the above embodiments, the data analyzed by the processor to group the users 2 comprise a plurality of text documents. However, in other embodiments, different data in addition to, or instead of, some or all of the text documents may be analyzed to group the users 2. Such data may include, for example, audio or video recordings made by the users 2.

We claim:

1. A method of processing a plurality of linguistic expressions, each linguistic expression originating from an originator, and each linguistic expression being a linguistic expression in which the originator of that linguistic expression expresses a respective sentiment with respect to one or more topics, the method comprising:

for each linguistic expression, detecting, by one or more processors, one or more topics of interest addressed in that linguistic expression by the originator of that linguistic expression;

for each linguistic expression, for each topic detected in that linguistic expression, assessing, by the one or more processors, a sentiment of the originator of that linguistic expression with respect to that topic;

grouping, by the one or more processors, the originators into one or more groups based on similarities between the originators' respective sets of detected topic-sentiment pairs;

associating with a given group, by the one or more processors, semantic information, wherein the semantic information associated with the given group relates to one or more features selected from a group of features consisting of:

properties of one or more members of that given group and the sets of topic-sentiment pairs of one or more of the members of that given group; and for a given originator, creating or updating, by the one or more processors, a profile;

wherein the given originator is a member of the given group;

wherein the profile is created or updated such that it comprises attributes of the given originator; and wherein the attributes are dependent upon the given originator's membership in the given group and the semantic information associated with the given group.

2. A method according to claim 1:
wherein each originator is a user of a network;
wherein each linguistic expression is made available on the network, by its originator, to other users of the network; and
wherein the network is selected from a group consisting of: the Internet, an intranet, a social network, and an online forum.

3. A method according to claim 1 further comprising:
receiving, by the one or more processors, categorization information corresponding to one or more of the members of the given group;
wherein the semantic information that is associated with the given group comprises some or all of the received categorization information.

4. A method according to claim 1 wherein associating the semantic information with the given group comprises using knowledge of a given topic and knowledge of a predominant sentiment with respect to that given topic of the members of the given group.

5. A method according to claim 1 further comprising:
for one or more of the groups of which the given originator is a member, determining, by the one or more processors, a respective membership value, the respective membership value being dependent on the degree of affiliation of the given originator with a respective group; and
including, by the one or more processors, in the profile of a second originator, the one or more membership values.

6. A method according to claim 1 wherein one or more of the linguistic expressions are text documents.

7. A method according to claim 1 further comprising:
delivering, by the one or more processors, for interaction with a second originator, data depending on the profile of the second originator.

8. Apparatus for processing a plurality of linguistic expressions, each linguistic expression originating from an originator, and each linguistic expression being a linguistic expression in which the originator of that linguistic expression expresses a respective sentiment with respect to one or more topics, the apparatus comprising one or more processors configured to:

for each linguistic expression, detect one or more topics of interest addressed in that linguistic expression by the originator of that linguistic expression;

for each linguistic expression, for each topic detected in that linguistic expression, assess a sentiment of the originator of that linguistic expression with respect to that topic;

group the originators into one or more groups based on similarities between the originators' respective sets of detected topic-sentiment pairs;

associate, with a given group, semantic information, wherein the semantic information associated with the given group relates to one or more feature selected from a group of features consisting of: properties of one or more members of that given group and the sets of topic-sentiment pairs of one or more of the members of that given group; and for a given originator, create or update a profile;

wherein the given originator is a member of the given group;

wherein the profile is created or updated such that it comprises attributes of the given originator; and wherein the attributes are dependent upon the given originator's membership in the given group and the semantic information associated with the given group.

9. Apparatus according to claim 8:
wherein each originator is a user of a network;
wherein each linguistic expression is made available on the network, by its originator, to other users of the network; and
wherein the network is selected from a group consisting of: the Internet, an intranet, a social network, and an online forum.

10. Apparatus according to claim 8:
wherein the one or more processors are further configured to receive categorization information corresponding to one or more of the members of the given group; and
wherein the semantic information that is associated with the given group comprises some or all of the received categorization information.

11. Apparatus according to claim 8 wherein associating the semantic information with the given group comprises using knowledge of a given topic and knowledge of a predominant sentiment with respect to that given topic of the members of the given group.

12. Apparatus according to claim 8 wherein the one or more processors are further configured to:
for one or more of the groups of which the given originator is a member, determine a respective membership value, the respective membership value being dependent on the degree of affiliation of the given originator with a respective group; and
include in the profile of a second originator, the one or more membership values.

13. Apparatus according to claim 8 wherein one or more of the linguistic expressions are text documents.

14. Apparatus according to claim 8 wherein the one or more processors are further configured to deliver, for interaction with a second originator, data depending on the profile of the second originator.

* * * * *